(12) United States Patent
Yamamoto et al.

(10) Patent No.: US 8,962,498 B2
(45) Date of Patent: Feb. 24, 2015

(54) LIQUID CURABLE SILICONE RUBBER COMPOSITION AND WOVEN FABRIC COATED WITH CURED PRODUCT OF THE SAME COMPOSITION

(75) Inventors: Shinichi Yamamoto, Chiba (JP); Yuichi Tsuji, Chiba (JP); William R. Blackwood, Midland, MI (US)

(73) Assignees: Dow Corning Toray Co., Ltd., Chiyoda-Ku, Tokyo (JP); Dow Corning Corporation, Midland, MI (US)

( * ) Notice: Subject to any disclaimer, the term of this patent is extended or adjusted under 35 U.S.C. 154(b) by 0 days.

(21) Appl. No.: 13/640,622

(22) PCT Filed: Apr. 26, 2011

(86) PCT No.: PCT/US2011/033963
§ 371 (c)(1),
(2), (4) Date: Nov. 26, 2012

(87) PCT Pub. No.: WO2011/137121
PCT Pub. Date: Nov. 3, 2011

(65) Prior Publication Data
US 2013/0071591 A1    Mar. 21, 2013

Related U.S. Application Data

(60) Provisional application No. 61/329,589, filed on Apr. 30, 2010.

(51) Int. Cl.
| | | |
|---|---|---|
| *B32B 27/12* | (2006.01) | |
| *C09D 183/06* | (2006.01) | |
| *C08L 83/04* | (2006.01) | |
| *C09D 183/04* | (2006.01) | |
| *B60R 21/235* | (2006.01) | |
| *D03D 1/04* | (2006.01) | |
| *C08G 77/12* | (2006.01) | |
| *C08G 77/20* | (2006.01) | |

(52) U.S. Cl.
CPC ............... *C09D 183/06* (2013.01); *C08L 83/04* (2013.01); *C09D 183/04* (2013.01); *B60R 21/235* (2013.01); *D03D 1/04* (2013.01); *C08G 77/12* (2013.01); *C08G 77/20* (2013.01); *C08L 2205/03* (2013.01)
USPC ........................................................ 442/157

(58) Field of Classification Search
CPC ..... C08L 83/00; C08L 83/04; C08L 2205/03; C09D 183/04; C09D 183/06; B60R 21/235; C08G 77/12; C08G 77/20; D03D 1/04; B32B 27/12
USPC .................... 442/59, 157; 524/500; 427/387; 428/36.1
See application file for complete search history.

(56) References Cited

U.S. PATENT DOCUMENTS

| | | | |
|---|---|---|---|
| 7,150,803 B2* | 12/2006 | Aketa et al. ................... | 156/329 |
| 7,699,337 B2* | 4/2010 | Ikeno et al. .................. | 280/728.1 |
| 8,304,084 B2* | 11/2012 | Mizushima et al. .......... | 428/447 |
| 2007/0100065 A1 | 5/2007 | Iwata et al. | |

(Continued)

FOREIGN PATENT DOCUMENTS

| | | |
|---|---|---|
| EP | 1688463 A1 | 9/2006 |
| EP | 2053160 A1 | 4/2009 |
| JP | 2006241438 A | 9/2006 |

(Continued)

OTHER PUBLICATIONS

English language abstract and machine-assisted English translation for JP 2006241438 extracted from the PAJ database on Jan. 25, 2013, 50 pages.

(Continued)

*Primary Examiner* — Arti Singh-Pandey
(74) *Attorney, Agent, or Firm* — Howard & Howard Attorneys PLLC

(57) ABSTRACT

Provided is a liquid curable silicone rubber composition containing the following components of (A), (B), (C) and (D): (A) 100 parts by weight of an organopolysiloxane having one or more silicon atom-bonded alkenyl groups on average in one molecule, (B) (B-1) an organohydrogenpolysiloxane having at least three silicon atom-bonded hydrogen atoms in one molecule, wherein at least one of the hydrogen atoms is present as a siloxane unit represented by the formula of $R1HSiO2/2$ (wherein R1 represents a non-substituted or substituted monovalent hydrocarbon group containing no aliphatic unsaturated bond) in the molecule and (B-2) a linear organohydrogenpolysiloxane having one silicon atom-bonded hydrogen atom only at each of both terminals of the molecular chain and having no aliphatic unsaturated bond(s) in a molecule, [provided that the blending amount of component (B-1) and component (B-2) is an amount such that the molar ratio of silicon atom-bonded hydrogen atoms contained in component (B-1) and component (B-2):alkenyl groups contained in component (A) ranges from (0.8:1.0) to (2.5:1.0), and the total number of silicon atom-bonded hydrogen atoms contained in component (B-2) is 70 to 100% of the total number of silicon atom-bonded hydrogen atoms contained in component (B-1) and component (B-2); provided that when the aforementioned numerical value is 100%, component (B) consists only of (B-2).] (C) a hydrosilylation reaction catalyst: an amount to cure the present composition, and (D) 0.1 to 50 parts by weight of a reinforcing silica fine powder. A coated woven fabric with a silicone rubber-coated layer formed of a cured product of this liquid curable silicone rubber composition is suitable as a coated woven fabric for use in airbags.

14 Claims, No Drawings

(56) References Cited

U.S. PATENT DOCUMENTS

2010/0190395 A1 7/2010 Nozoe et al.
2012/0071052 A1 3/2012 Sweet et al.

FOREIGN PATENT DOCUMENTS

| JP | 2008528788 A | 7/2008 |
|---|---|---|
| WO | WO 2006/083339 A1 | 8/2006 |
| WO | WO 2008/020605 A1 | 2/2008 |

OTHER PUBLICATIONS

English language abstract not found for JP 2008528788. However see English language equivalent US 2012/0071052 and WO 2006/083339 A1.
See first page of PCT Publication for English Language abstract for WO 2008/020605 and also see English language equivalent US 2010/0190395.
International Search Report for Application No. PCT/US2011/033963 dated Dec. 8, 2011, 3 pages.

* cited by examiner

LIQUID CURABLE SILICONE RUBBER COMPOSITION AND WOVEN FABRIC COATED WITH CURED PRODUCT OF THE SAME COMPOSITION

RELATED APPLICATION

This application is the U.S. National Stage of International Patent Application No. PCT/JP2011/033963, filed on Apr. 26, 2011, which claims priority to and the benefit under 35 U.S.C. §119(e) of U.S. Provisional Application No. 61/329,589, filed Apr. 30, 2010, which is incorporated herein by reference in its entirety.

TECHNICAL FIELD

The present invention relates to a liquid curable silicone rubber composition, and a woven fabric coated with a cured product of the silicone rubber composition. Specifically, the present invention relates to a liquid curable silicone rubber composition which is adequate for the production of a silicone rubber-coated woven fabric suitable for use in airbags.

BACKGROUND ART

Silicone rubber-coated woven fabrics, which are produced by coating a silicone rubber on a woven fabric, have been used in the form of a sealed body made of the woven fabric appropriately in automotive airbags or the like.

Japanese Unexamined Patent Application, First Publication No. 2006-241438 describes an addition reaction-curable silicone composition containing a fine silica powder having a specific surface area of 50 m$^2$/g or higher as measured by a BET method and an adhesion promoter, which is intended for providing a curtain airbag that suppresses the leakage of inflator gases from an airbag and shows excellent duration of an inflated state thereof, and a liquid silicone rubber coating composition useful for the production of the curtain airbag.

Further, Published Japanese Translation No. 2008-528788 of the PCT International Publication describes a hydrosilylation reaction-curable composition for coating fabrics, which exhibits favorable adhesion to synthetic fiber materials (for example, polyesters, or polyamides such as Nylon 66). In addition, this composition is described to be suitable as an agent for coating fabrics, which has been used for the production of automotive airbags.

Further, the present applicant discloses, in WO2008/020605, a coated woven fabric which is suitable for use in airbags and exhibits no significant drop of a differential gas pressure between two spaces comparted by the coated woven fabric for a relatively long time, and a hydrosilylation reaction-curable type curable silicone composition as a woven fabric-coating silicone rubber composition for the formation of the coated woven fabric.

DISCLOSURE OF INVENTION

Technical Problems

However, when the coating amount of a curable silicone rubber composition applied to a woven fabric is reduced for the purpose of reduction of the weight of a curtain airbag and cost, using a conventional known curable silicone rubber composition for coating woven fabrics, there is a problem in that the inflation duration of the airbag is excessively shortened.

It is an object of the present invention to provide a novel liquid curable silicone rubber composition for coating a woven fabric. The liquid curable silicone rubber composition of the present invention is capable of sustaining a long inflation time for the inflated airbag even when the coating amount of the composition applied to a woven fabric is reduced for the purpose of weight and cost reduction in an airbag. Further, a cured product of the liquid curable silicone rubber composition is excellent in terms of heat resistance and moisture resistance and is particularly appropriate as a curable silicone rubber composition for coating a woven fabric which is used for producing curtain airbags. Further, the present invention provides a silicone rubber-coated woven fabric which is produced using this liquid curable silicone rubber composition, an airbag which is produced from the same woven fabric, and a method for producing the same.

Technical Solution

The liquid curable silicone rubber composition of the present invention contains the following components of (A), (B), (C) and (D):

(A) an organopolysiloxane having one or more silicon atom-bonded alkenyl groups on average in one molecule: 100 parts by weight, (B) (B-1) an organohydrogenpolysiloxane having at least three silicon atom-bonded hydrogen atoms in one molecule, wherein at least one of the hydrogen atoms is present as a siloxane unit represented by the formula of $R^1HSiO_{2/2}$ (wherein $R^1$ represents a non-substituted or substituted monovalent hydrocarbon group containing no aliphatic unsaturated bond) in the molecule and (B-2) a linear organohydrogenpolysiloxane having one silicon atom-bonded hydrogen atom only at each of both terminals of the molecular chain and having no aliphatic unsaturated bond(s) in a molecule,

[provided that the blending amount of component (B-1) and component (B-2) is an amount such that the molar ratio of silicon atom-bonded hydrogen atoms contained in component (B-1) and component (B-2):alkenyl groups contained in component (A) ranges from (0.8:1.0) to (2.5:1.0), and the total number of silicon atom-bonded hydrogen atoms contained in component (B-2) is 70 to 100% of the total number of silicon atom-bonded hydrogen atoms contained in component (B-1) and component (B-2); provided that when the aforementioned numerical value is 100%, component (B) consists only of (B-2).]

(C) a hydrosilylation reaction catalyst: an amount to cure the present composition, and (D) a reinforcing silica fine powder: 0.1 to 50 parts by weight.

The liquid curable silicone rubber composition preferably further contains (E) an adhesion promoter: 0.05 to 5 parts by weight.

Further, the woven fabric of the present invention is characterized by being coated with a cured product of the liquid curable silicone rubber composition.

The woven fabric coated with a cured product of the liquid curable silicone rubber composition of the present invention is preferable as a woven fabric for the production of an airbag, particularly a curtain airbag.

Further, the present invention provides a method for producing the woven fabric, the method including coating the liquid curable silicone rubber composition onto a woven fabric, and then curing the liquid curable silicone rubber composition to form a cured silicone rubber coating layer on the woven fabric.

The present inventors unexpectedly discovered that if component (B) in a liquid curable silicone rubber composition containing components (A) to (D) and optionally further containing component (E) uses (B-1) and (B-2) such that the total number of silicon atom-bonded hydrogen atoms contained in component (B-2) becomes 70 to 100% of the total number of silicon atom-bonded hydrogen atoms contained in component (B-1) and component (B-2) or uses only component (B-2), even when an amount of the liquid curable silicone rubber composition applied to a woven fabric is decreased, duration of an inflation time of an airbag upon inflation of an airbag made of the resulting silicone rubber-coated woven fabric is superior. The present invention has been completed based on these findings.

DETAILED DESCRIPTION OF INVENTION

As described above, the liquid curable silicone rubber composition of the present invention contains components (A), (B), (C) and (D) as essential components and may further contain optionally component (E). In addition, component(s) other than components (A) to (E) may be further added to the liquid curable silicone rubber composition of the present invention. Hereinafter, components (A) to (E) and other additional components will be described.

In the present specification, the number of alkenyl groups in one molecule or the number of silicon atom-bonded hydrogen atoms in one molecule, as possessed by one kind of polyorganosiloxane, refers to the mean value of the total polyorganosiloxanes with respect to a mixture of molecules each having a different number. The amount of silicon atom-bonded hydrogen atoms of a polyorganosiloxane may be determined according to a bromine titration method. The alkenyl content (% by weight) in an organopolysiloxane having alkenyl groups is a value representing a proportion that a weight obtained by multiplying the formula weight of an alkenyl group by the amount of unsaturated groups (molar equivalent of unsaturated groups contained in 1 g of organopolysiloxane) of the organopolysiloxane obtained by measurement with iodine titration accounts for in the weight of the alkenyl group-containing polyorganosiloxane. In this case, the alkenyl group refers to an unsaturated group-containing organic group bonded to a silicon atom. For example, when the alkenyl group is a vinyl group bonded to a silicon atom, the formula weight of an alkenyl group is 27.02 which corresponds to $C_2H_3$. When the alkenyl group bonded to a silicon atom is an allyl group, the formula weight of an alkenyl group is 41.05 which corresponds to $C_3H_5$.

Unless otherwise specified, the viscosity in the present specification refers to a value measured by using a V- or BH-type rotary viscometer at 25° C., and the value of kinematic viscosity refers to a value measured by using an Ubbelohde viscometer at 25° C. BET surface area is a value measured according to JIS K 6430.

Component (A)

An organopolysiloxane having one or more silicon atom-bonded alkenyl groups on average in a molecule, which is used as component (A), is a compound having a main chain composed of a chain of —Si—O— bonds and having silicon atom-bonded alkenyl and other organic groups. Examples of the alkenyl group of component (A) include a vinyl group, an allyl group, a butenyl group, a pentenyl group, a hexenyl group, and a heptenyl group. A vinyl group is preferable. Examples of the silicon atom-bonded organic group other than the alkenyl group in component (A) include alkyl groups such as a methyl group, an ethyl group, a propyl group, a butyl group, a pentyl group and a hexyl group; aryl groups such as a phenyl group, a tolyl group and a xylyl group; and halogenated alkyl groups such as a 3-chloropropyl group and a 3,3,3-trifluoropropyl group. The silicon atom-bonded organic group is preferably selected from the group consisting of a methyl group and a phenyl group. Further, the organopolysiloxane of component (A) may contain, at the molecular chain terminal or side chain, a small amount of groups selected from the group consisting of a hydroxyl group and an alkoxy group such as a methoxy group and an ethoxy group, as long as it is possible to achieve the object of the present invention.

Component (A) preferably consists of component (A-1), or component (A-1) and component (A-2), which are described below. In addition, the explanation regarding an alkenyl group and other organic groups of component (A) applies to component (A-1) and component (A-2) in the same way as before.

Component (A-1): an organopolysiloxane having at least two alkenyl groups in one molecule, in which the content of the alkenyl group is less than 2% by weight, preferably ranges from 0.02 to 1.9% by weight, and particularly preferably ranges from 0.02 to 0.5% by weight.

Component (A-2): an organopolysiloxane having at least two alkenyl groups in one molecule, in which the content of the alkenyl group is 5% by weight or more, preferably ranges from 8 to 50% by weight, and particularly preferably ranges from 8 to 40% by weight.

Component (A-1)

Component (A-1) may be one kind of organopolysiloxane or a mixture of two or more kinds of organopolysiloxanes. The amount of alkenyl groups contained in component (A-1) or, if two or more kinds of organopolysiloxanes are used as component (A-1), the amount of alkenyl groups contained in the entire mixture thereof, is less than 2% by weight on average, preferably ranges from 0.02 to 1.9% by weight, and particularly preferably ranges from 0.02 to 0.5% by weight. This is because favorable mechanical properties can be obtained in a cured product of a liquid curable silicone rubber composition, by using component (A-1) in which the amount of alkenyl groups is less than 2% by weight.

Although the molecular structure of the organopolysiloxane of component (A-1) is preferably linear, the organopolysiloxane may have a branched structure within the range which the purpose of the present invention can be achieved.

Component (A-1) preferably has a viscosity at 25° C. of 100 to 1,000,000 mPa·s, particularly preferably 300 to 100,000 mPa·s. However, component (A-1) is not limited to that having such a viscosity.

Examples of the organopolysiloxane used as component (A-1) include a dimethylpolysiloxane terminated with dimethylvinylsiloxy groups at both terminals of the molecular chain, a copolymer of dimethylsiloxane and methylvinylsiloxane terminated with dimethylvinylsiloxy groups at both terminals of the molecular chain, a copolymer of dimethylsiloxane and methylvinylsiloxane terminated with trimethylsiloxy groups at both terminals of the molecular chain; an organopolysiloxane consisting of a siloxane unit represented by the formula of $(CH_3)_2ViSiO_{1/2}$, a siloxane unit represented by the formula of $(CH_3)_3SiO_{1/2}$ and a siloxane unit represented by the formula of $SiO_{4/2}$ (wherein Vi represents a vinyl group); an organopolysiloxane in which a portion or all of silicon atom-bonded methyl groups of the aforementioned organopolysiloxane are substituted by a group selected from the group consisting of an alkyl group (for example, an ethyl group or a propyl group) other than a methyl group, an aryl group (for example, a phenyl group or a tolyl group) and a halogenated alkyl group (for example, 3,3,3-trifluoropropyl); an organopolysiloxane in which a portion or all of vinyl groups of the aforementioned diorganopolysiloxane are substituted by an alkenyl group (for example, a group selected from an allyl group and a propenyl group) other than a vinyl group, and a mixture of two or more kinds of these organopolysiloxanes. Among these, a dimethylpolysiloxane terminated with dimethylvinylsiloxy groups at both terminals of the molecular chain is particularly preferably used as component (A-1), from the viewpoint of being capable of lowering a viscosity of the resulting liquid curable silicone rubber composition and obtaining a cured product having favorable mechanical properties from the curable composition.

Component (A-2)

Component (A-2) may be one kind of organopolysiloxane or a mixture of two or more kinds of organopolysiloxanes. The amount of alkenyl groups contained in organopolysiloxane of component (A-2) or, if two or more kinds of organopolysiloxanes as component (A-2) are used, the amount of alkenyl groups contained in the total mixture thereof is 5% by weight or more on average, preferably ranges from 8 to 50% by weight, and more preferably ranges from 8 to 40% by weight. The use of component (A-2) tends to improve mechanical properties (for example, elongation at break) of a cured product obtained from the curable composition of the present invention, and tends to have the ability to improve a drop of an differential gas pressure between the inside and the outside of an airbag upon inflation of an airbag fabricated using a coated woven fabric obtained using the curable composition of the present invention as a coating agent.

The molecular structure of the organopolysiloxane of component (A-2) may have a linear, cyclic, branched, reticulate or resin-like structure, and component (A-2) may also be a mixture of two or more kinds of organopolysiloxanes. The viscosity of component (A-2) at 25° C. is preferably less than 50 mPa·s in terms of a single organopolysiloxane or a mixture of two or more kinds of organopolysiloxanes, more preferably ranges from 0.1 to 40 mPa·s, and particularly preferably ranges from 1 to 40 mPa·s, but it is not limited thereto. This is because the use of component (A-2) having a viscosity within this range tends to have the ability to increase a mechanical property, for example, an elongation at break, of a cured product obtained from the curable composition of the present invention.

Examples of component (A-2) include a dimethylsiloxane oligomer terminated with dimethylvinylsiloxy groups at both terminals of the molecular chain, a methylvinylpolysiloxane terminated with dimethylhydroxysiloxy groups at both terminals of the molecular chain, a copolymer of dimethylsiloxane and methylvinylsiloxane terminated with dimethylhydroxysiloxy groups at both terminals of the molecular chain, a cyclic methylvinylsiloxane, a co-oligomer of dimethylsiloxane and methylvinylsiloxane terminated with trimethylsiloxy groups at both terminals of the molecular chain, a methylvinylsiloxane oligomer terminated with trimethylsiloxy groups at both terminals of the molecular chain, a diorganopolysiloxane in which a portion or all of methyl groups of the aforementioned diorganopolysiloxane are substituted by a group selected from the group consisting of an alkyl group such as an ethyl group or a propyl group; an aryl group such as a phenyl group or a tolyl group; and a halogenated alkyl group such as 3,3,3-trifluoropropyl group, an organopolysiloxane in which a portion or all of vinyl groups of the aforementioned diorganopolysiloxane are substituted by an allyl group or an alkenyl group such as a propenyl group, and a mixture of two or more kinds of the aforementioned organopolysiloxanes. Among these, component (A-2) is preferably selected from the group consisting of a methylvinylpolysiloxane terminated with dimethylhydroxysiloxy groups at both terminals of the molecular chain, a copolymer of dimethylsiloxane and methylvinylsiloxane terminated with dimethylhydroxysiloxy groups at both terminals of the molecular chain, a cyclic methylvinylpolysiloxane, and a methylvinylsiloxane oligomer terminated with trimethylsiloxy groups at both terminals of the molecular chain. In particular, a compound selected from the group consisting of a cyclic methylvinylpolysiloxane, a copolymer of dimethylsiloxane and methylvinylsiloxane terminated with dimethylhydroxysiloxy groups at both terminals of the molecular chain, and a mixture thereof is preferably used as component (A-2).

When component (A-1) in combination with component (A-2) are used as component (A), the total moles of alkenyl groups in component (A-2) are 0.5 to 2 times, preferably 0.6 to 1.8 times, particularly preferably 0.9 to 1.4 times the total moles of alkenyl groups in component (A-1). By using individual components such that moles of alkenyl groups in component (A-2) relative to moles of alkenyl groups in component (A-1) are within the above-specified range, it tends to have the ability to improve the mechanical properties of a cured product obtained from the curable composition of the present invention and adhesive strength thereof to a woven fabric and a drop of an differencial gas pressure between the inside and the outside of an airbag upon inflation of an airbag obtained from the coated woven fabric of the present invention.

Component (B)

Component (B) is a curing agent for crosslinking and curing component (A) through the hydrosilylation reaction by reaction with component (A) in the presence of a hydrosilylation reaction catalyst of component (C) to be described hereinafter, and is an organohydrogenpolysiloxane having silicon atom-bonded hydrogen atoms. The organohydrogenpolysiloxane, which is used as component (B), is selected from the group consisting of linear, branched and cyclic compounds having a main chain composed of —Si—O— bonds and having silicon atom-bonded hydrogen atoms and silicon atom-bonded organic groups. Further, component (B) contains the following component (B-1) and component (B-2) or consists only of component (B-2).

One of technical features of the liquid curable composition of the present invention is to use component (B-2) in a larger amount than that of component (B-1), or only component (B-2), as a curing agent component of component (B).

Component (B-1)

Component (B-1) is an organohydrogenpolysiloxane having at least three silicon atom-bonded hydrogen atoms in one molecule, wherein at least one of the hydrogen atoms is present as a siloxane unit represented by the formula of $R^1HSiO_{2/2}$ (wherein $R^1$ represents a non-substituted or substituted monovalent hydrocarbon group containing no aliphatic unsaturated bond) in the molecule.

Component (B-1) may have a linear, branched or cyclic molecular structure. Examples of component (B-1) include a copolymer of dimethylsiloxane and methylhydrogensiloxane terminated with trimethylsiloxy groups at both terminals of the molecular chain, a copolymer of dimethylsiloxane and methylhydrogensiloxane terminated with dimethylhydrogensiloxy group(s) at either or both terminals of the molecular chain, an organohydrogenpolysiloxane in which a portion or all of methyl groups of these copolymers are substituted by a group selected from the group consisting of an alkyl group (for example, an ethyl group or a propyl group) other than a methyl group, an aryl group (for example, a phenyl or a tolyl group) and a halogenated alkyl group (for example, 3,3,3-trifluoropropyl group), and a mixture of two or more kinds selected from these. It is particularly preferable to use one or a mixture of two or more kinds of copolymers of dimethylsiloxane and methylhydrogensiloxane terminated with trimethylsiloxy groups at both terminals of the molecular chain as component (B-1).

Component (B-1) preferably has a kinematic viscosity of 1 to 100 mm$^2$/s, particularly 3 to 50 mm$^2$/s, but the kinematic viscosity of component (B-1) is not limited thereto.

Component (B-2)

Component (B-2) is a linear organohydrogenpolysiloxane having one silicon atom-bonded hydrogen atom only at each of both terminals of the molecular chain and having no aliphatic unsaturated bond(s) in a molecule.

Examples of component (B-2) include a dimethylsiloxane terminated with dimethylhydrogensiloxy groups at both terminals of the molecular chain, a terminal silicon-bonded hydrogen-containing organopolysiloxane in which a portion or all of methyl groups of the aforementioned polyorganosiloxane are substituted by a group selected from the group consisting of an alkyl group (for example, an ethyl group or a propyl group) other than a methyl group, an aryl group (for example, a phenyl group or a tolyl group) and a halogenated alkyl group (for example, 3,3,3-trifluoropropyl group), and a mixture of two or more kinds of these organopolysiloxanes. The kinematic viscosity of these organohydrogenpolysiloxanes is typically in the range of 1 to 100 mm$^2$/s, and preferably 3 to 30 mm$^2$/g, but is not particularly limited thereto.

Use Ratio of Components (B-1) and (B-2) Relative to Component (A)

The used amount of component (B-1) and component (B-2) is an amount such that the molar ratio of silicon atom-bonded hydrogen atoms contained in component (B-1) and component (B-2):alkenyl groups contained in component (A) ranges from (hydrogen atoms:alkenyl groups)=(0.8:1.0) to (2.5:1.0), and the total number of silicon atom-bonded hydrogen atoms contained in component (B-2) becomes 70 to 100% of the total number of silicon atom-bonded hydrogen atoms contained in component (B-1) and component (B-2). Therefore, when this numerical value is 100%, component (B) consists only of component (B-2). That is, one of the features of the present invention is that the present invention uses only component (B-2) or uses component (B-1) in combination with component (B-2) such that 70% or more of silicon atom-bonded hydrogen atoms contained in component (B) are derived from component (B-2).

Component (C)

Component (C) is a hydrosilylation catalyst which promotes the hydrosilylation reaction between alkenyl groups in component (A) and silicon atom-bonded hydrogen atoms in component (B). Component (C) may be any compound as long as it is capable of promoting the hydrosilylation reaction. From the viewpoint of a high promoting action for hydrosilylation reaction and relatively easy availability, a platinum compound is preferable as component (C). Examples of the platinum compound include platinum fine powder; chloroplatinic acid or an alcoholic solution of chloroplatinic acid; complexes of chloroplatinic acid with olefins, complexes of chloroplatinic acid with alkenyl siloxanes; complexes of platinum with diketones; metallic platinum supported on silica, alumina or carbon; and thermoplastic resin powder containing platinum compounds. A platinum group metal catalyst other than a platinum compound may also be used and examples thereof include rhodium, ruthenium, iridium, and palladium compounds, for example, RhCl(PPh$_3$)$_3$, RhCl(CO)(PPh$_3$)$_2$, Ru$_3$(CO)$_{12}$, IrCl(CO)(PPh$_3$)$_2$ and Pd(PPh$_3$)$_4$ wherein Ph represents a phenyl group.

The used amount of component (C) in the curable composition of the present invention is an amount sufficient to cure the curable composition of the present invention through a hydrosilylation reaction. The term "amount sufficient to cure the composition of the present invention" refers to an amount sufficient to cure the curable composition of the present invention within a desired time under arbitrary conditions to cure a composition depending on the composition of individual compositions of the present invention. A desired amount of component (C) can be easily determined by those skilled in the art. The blending amount of component (C) is typically in the range of 0.1 to 500 parts by weight, and preferably 1 to 50 parts by weight, in terms of platinum group metal based on 1,000,000 parts by weight of component (A). By using an amount of a platinum group metal within this range, it is possible to achieve a sufficiently rapid curing time under curing conditions of, for example, 25° C. to 200° C.

Component (D)

Component (D) is a reinforcing silica fine powder. The reinforcing silica fine powder is a component to improve mechanical strength of a cured product obtained by curing the liquid curable silicone rubber composition of the present invention. Examples of the component (D) include a fumed silica fine powder, a precipitated silica fine powder, and a hydrophobic silica fine powder obtained by further treating surfaces of these silica fine powders with an organic silicon compound or the like. Among these, a reinforcing silica fine powder having BET specific surface area of 50 m$^2$/g or more is preferable. The blending amount of the reinforcing silica fine powder may be any amount within the range in which desired physical properties of the cured product are obtained, although it is not particularly limited. For example, the amount of the reinforcing silica fine powder is preferably in the range of 0.1 to 50 parts by weight, more preferably 5 to 40 parts by weight based on 100 parts by weight of component (A).

Component (E)

In order to enhance the adhesion between the cured product obtained from the curable composition of the present invention and a substrate woven fabric, an adhesion promoter as component (E) may be added to the curable composition of the present invention.

The adhesion promoter is not limited to a specific compound. Examples of the adhesion promoter that can be used in the present invention include organic titanium compounds such as organic titanic acid esters; metal chelate compounds such as a titanium chelate compound, an aluminum chelate compound, and a zirconium chelate compound; alkoxysilanes such as an epoxy group-containing organoalkoxysilane, an acryloxy group-containing organoalkoxysilane, and a methacryloxy group-containing organoalkoxysilane; epoxy group-containing organopolysiloxanes, and organopolysiloxanes containing an epoxy group, an alkenyl group and an alkoxy group in one molecule. In addition, an epoxy group, an acryloxy group, a methacryloxy group or the like may be connected to a silicon atom via another group such as an alkylene group. Among them, the use of the aforementioned alkoxysilanes or the combined use of a metal chelate compound with organoalkoxysilanes is preferable for improving adhesion between the cured silicone rubber composition and the woven fabric. In addition, the combined use of a methacryloxy group-containing organoalkoxysilane and a zirconium chelate compound, or the combined use of a methacryloxy group-containing organoalkoxysilane, an epoxy group-containing organoalkoxysilane and a zirconium chelate compound is also preferable. The amount of component (E) used in the curable silicone rubber composition of the present invention is not limited to a specific amount, but it is preferably in the range of 0.05 to 5 parts by weight, and more preferably 0.1 to 2 parts by weight based on 100 parts by weight of component (A).

Other Components

To the liquid curable silicone rubber composition of the present invention may be added additives known in the silicone rubber field, in addition to the aforementioned components.

For the purpose of improving a storage stability of the curable composition of the present invention and/or improving handling workability, the composition may incorporate, as an additional additive, a curing retardant selected from acetylene compounds such as 1-ethynyl-1-cyclohexanol, 2-methyl-3-butyn-2-ol, 3,5-dimethyl-1-hexyn-3-ol, 3,5-dimethyl-1-octyn-3-ol and 2-phenyl-3-butyn-2-ol; enyne compounds such as 3-methyl-3-penten-1-yne and 3,5-dimethyl-3-hexen-1-yne; triazoles such as benzotriazole; phosphines; mercaptanes; and hydrazines. When a curing retardant is used, an addition amount thereof is not particularly limited, the addition amount of the curing retardant is preferably in the range of 0.001 to 5 parts by weight and particularly preferably 0.01 to 10 parts by weight based on 100 parts by weight of component (A).

The curable composition of the present invention may further incorporate various additives which are known in the art as additives for curable silicone rubber compositions. Examples of such additives include extender fillers such as a quartz powder, diatomaceous earth, calcium carbonate, and magnesium carbonate; heat resistance improvers such as cerium oxide, cerium hydroxide, and iron oxide; pigments such as colcothar, titanium oxide, and carbon black; flame retardants; and organopolysiloxane resins that do not contain alkenyl groups and do not have a softening point. One or more kinds of these additional additives may be added to the curable composition of the present invention, if necessary.

With regard to the liquid curable silicone rubber composition of the present invention, elongation at break of a cured product obtained by curing this composition is preferably 900% or more, and further preferably 1200% or more as measured according to JIS K6251. By formulating the curable composition such that elongation of a cured product of the silicone rubber composition is 900% or more, it is possible to decrease a drop over time of an differential gas pressure between the inside and the outside of an airbag upon inflation of an airbag made of a coated woven fabric obtained by coating this composition on a woven fabric. In particular, with regard to a liquid curable silicone rubber composition which is used for a coated woven fabric to be used for an airbag having a configuration in which a silicone rubber coating layer is formed at the outside of the airbag, that is, the outside having a lower gas pressure than the internal pressure, a cured product of the liquid curable silicone rubber composition preferably has an elongation at break of 900% or more, as measured according to JIS K6251.

The liquid curable silicone rubber composition of the present invention is preferably blended to have a viscosity at 25° C. of 100 to 500 Pa·s. Further, it is further preferable that the liquid curable composition of the present invention does not contain a solvent for adjusting a viscosity. In particular, it is preferable that the liquid curable composition of the present invention does not contain a solvent and has a viscosity of 100 to 300 Pa·s. The reason why no addition of a solvent to the curable composition of the present invention is preferable is because a solventless curable composition exhibits excellent handling workability when it is applied to a woven fabric, and there is a tendency in which defects do not readily occur on a coating film obtained after curing of the composition.

Method for Producing Liquid Curable Silicone Rubber Composition

The method for preparing the liquid curable silicone rubber composition of the present invention is not limited to a specific method, and the composition can be prepared by mixing components (A) to (D), if necessary, with component (E) and other optional components. Particularly preferably, a reinforcing silica fine powder-containing master batch prepared by heating and mixing a part of component (A) with component (D) is prepared in advance and the remaining part of component (A) and components (B) and (C), if necessary, component (E) and other desired additives are then added thereto, followed by mixing. If components other than (A) to (D) are blended in a curable composition, they may be added thereto during the preparation of the reinforcing silica fine powder-containing master batch. If there is a possibility that heating and mixing deteriorate additives other than components (A) to (D), such additives are preferably added to the master batch together with the remaining part of component (A) and components (B) and (C) when they are added to the master batch. Furthermore, when preparing the master batch, the aforementioned organosilicon compound, which is used for modifying the surface of a reinforcing silica fine powder of component (D) hydrophobically, is added to the master batch to carry out in-situ treatment for hydrophobicizing the surface of component (D).

Mixing of raw materials for preparing the liquid curable silicone rubber composition of the present invention can be carried out using any known method and equipment for producing a liquid curable silicone rubber composition. Examples of available apparatus include known kneading equipment such as a two-roll mill, a three-roll mill, a kneader-mixer, and a Ross mixer.

From the viewpoint of obtaining better storage stability, the curable composition of the present invention is preferably formulated into a two-part liquid composition which consists of a composition (I) that contains a part of component (A), component (C) and a part of component (D) without component (B) and a composition (II) that contains the remaining part of component (A), component (B) and component (D) without component (C).

Preferable Uses of Liquid Curable Silicone Rubber Composition of the Present Invention The liquid curable silicone rubber composition of the present invention is suitable for coating woven fabrics. That is, a woven fabric coated with a cured product of the liquid curable composition of the present invention also falls within the scope of the present invention. A cured silicone rubber-coated layer can be formed on a woven fabric by coating the liquid curable silicone rubber composition of the present invention onto a woven fabric and then curing the composition. Examples of the woven fabric include fabrics made of polyamide fibers such as Nylon 6, Nylon 66 and Nylon 46; fabrics made of polyester fibers such as polyethylene terephthalate and polybutylene terephthalate; polyacrylonitrile fiber fabric, aramid fiber fabric, polyether imide fiber fabric, polysulfone fiber fabric, carbon fiber fabric, rayon fiber fabric, and polyethylene fiber fabric, or a non-woven fabric made from the aforementioned fibers. For example, it is preferable to use polyamide fiber fabric or polyester fiber fabric for applications requiring high strength, such as automotive airbags. Prior to coating with the liquid curable silicone rubber composition of the present invention, the woven fabric is preferably washed with water and dried.

A woven fabric obtained by coating and curing the liquid curable silicone rubber composition of the present invention is preferable as a coated woven fabric for use in airbags for automotives or the like. Although there is no particular limitation with regard to the structure of woven fabric for airbags, this is typically a flat woven fabric but it is possible to preferably use a hollow woven fabric having an envelope-like space at the center of the woven fabric structure. In the case where the curable composition of the present invention is applied to the hollow woven fabric, the silicone rubber-coated layer should be provided on the outer surface of the fabric, due to the structure of such a woven fabric. Even in such a case, since the silicone rubber-coated layer obtained by curing the curable composition of the present invention has excellent elongation at break, an airbag fabricated using the coated hollow woven fabric obtained by coating the curable composition of the present invention tends to exhibit an ability to improve a drop of a differential gas pressure between the inside and the outside of an inflated airbag upon inflation of an airbag by blowing a high-pressure gas into the internal space thereof.

As a method for applying the liquid curable silicone rubber composition of the present invention onto the woven fabric, known processes such as spraying, gravure coating, bar coating, knife coating, patting, screen printing, and dipping can be used. The coating amount of the curable composition onto a woven fabric is typically in the range of 25 to 150 g/m$^2$. Curing of the curable composition of the present invention applied onto the woven fabric is typically carried out by heating the composition at a temperature of from 150 to 200° C. for 1 to 2 minutes.

The coated woven fabric obtained by coating the curable silicone rubber composition of the present invention has at least one coating layer formed of a cured product of the curable composition of the present invention. If necessary, however, one or more additional layers may be provided on the coated woven fabric. Such additional layers are applied typically for improving the tactile sensation of the surface of a coated woven fabric, for improving abrasion resistance of the surface of a coated woven fabric, and/or for improving the strength of a coated woven fabric. The additional coating layer may be exemplified by a plastic film, a woven fabric, a non-woven fabric, or a coating layer formed of an elastic coating material other than the cured silicone rubber of the present invention.

EXAMPLES

Hereinafter, the present invention is described in detail with reference to examples. It should be understood that the present invention is not limited to the examples. In the following examples, all parts are parts by weight and all viscosities are measured at 25° C. by using a V- or BH-type rotary viscometer. Kinematic viscosity refers to a value measured by using an Ubbelohde viscometer at 25° C. In the following description of chemical structures, Me designates methyl groups, and Vi designates vinyl groups. The content of vinyl group (% by weight) in vinyl group-containing polyorganosiloxane is a value representing a proportion of a weight obtained by multiplying the formula weight of a vinyl group ($C_2H_3$) by the amount of unsaturated groups (molar equivalent of unsaturated groups contained in 1 g of a sample) obtained by measurement with iodine titration to the weight of the vinyl group-containing polyorganosiloxane. The amount of silicon atom-bonded hydrogen atoms (% by weight) is a value representing a proportion of a weight obtained by multiplying an atomic weight of a hydrogen atom (H) by the amount of hydrogen atoms (molar equivalent of hydrogen atoms contained in 1 g of a sample) measured by bromine titration to the total weight of a compound having the hydrogen atom(s).

Method for Measuring Mechanical Properties of Silicone Rubber

A 2 mm-thick cured silicone rubber specimen was obtained by subjecting the following liquid curable silicone rubber composition to press curing for 10 minutes at 120° C. under a pressure of 20 MPa. Hardness of the silicone rubber was measured by a type A durometer in accordance with JIS K 6253. In addition, a dumbbell-like specimen having a shape in accordance with dumbbell no. 7 prescribed in JIS K 6251-1993 "Tensile test method of vulcanized rubber", but having a broadened handle of the specimen was prepared from the liquid curable silicone rubber composition. Tensile strength and elongation at break of the dumbbell-like specimen were measured in accordance with the method stipulated in JIS K 6251-1993.

Properties to Hold Inner Pressure

A Nylon 66 hollow woven fabric of 470 dtex, which had a weft density of 46 threads/inch, a warp density of 46 threads/inch and had a 5 L envelope-like inner space at the center thereof, with the inner space having a gas inlet port, was coated from both sides with a liquid curable silicone rubber composition in coating amounts shown in Table 1. Then, the silicone rubber composition coating layer was cured by heating for 2 minutes at 180° C., whereby a silicone rubber-coated hollow woven fabric was produced. The inner space of the obtained coated hollow woven fabric was inflated by blowing compressed gas under a pressure of 125 kPa through a gas inlet port into the inner space to adjust the inner pressure to 70 kPa. The gas inlet port was then promptly sealed, and the time required for a drop of the inner space pressure to a level of 50 kPa was evaluated. When the inner space pressure higher than 50 kPa was held for 6 seconds or more, this was regarded as passing the examination.

Scott Type Crease-Flex Abrasion Test

A woven fabric piece, which was cut out from the envelope-like part of the Nylon 66 hollow woven fabric for the above-mentioned measurement of properties to hold inner pressure, was coated with a 50 μm-thick layer of the liquid curable silicone rubber composition. Then, a silicone rubber-coated woven fabric was formed by holding the fabric in a heating furnace at 180° C. for 2 minutes to thereby cure the composition. The obtained silicone rubber-coated woven fabric was subjected to 1000 loading cycles using a Scott type crease-flex abrasion tester with a load of 1 kgf and then the condition of the silicone rubber-coated layer was visually observed. A fabric which did not contain any changes was evaluated as grade 5, a fabric that contained slight stripe-like marks was evaluated as grade 4, a fabric with slight and partial peeling of the silicone rubber-coated layer was evaluated as grade 3, a fabric with noticeable partial peeling of the silicone rubber-coated layer was evaluated as grade 2, and a fabric with significant peeling of the silicone rubber-coated layer over the entire surface of the fabric was evaluated as grade 1.

Preparation Example 1

A Ross mixer was charged with 100 parts by weight of a dimethylpolysiloxane that was terminated at both terminals of the molecular chain with dimethylvinylsiloxy groups and had a viscosity of 40,000 mPa·s; 36 parts by weight of fumed silica having BET specific surface area of 225 m$^2$/g; 7 parts by weight of a hexamethyldisilazane; and 1.4 parts by weight of water. After the components were mixed to uniformity at room temperature, the obtained mixture was heat-treated for 2 hours at 200° C. under a reduced pressure, whereby a flowable silica master batch 1 was prepared.

Examples 1 to 4 and Comparative Examples 1 and 2

Liquid curable silicone rubber compositions were prepared by uniformly mixing individual components in the blending amounts shown in Table 1. Mechanical properties of the cured silicone rubbers obtained from the individual liquid curable silicone rubber compositions, ability of the cured silicone rubbers to hold inner pressure, and Scott type crease-flex abrasion test characteristics were measured according to the aforementioned method. The results obtained are shown in Table 1.

Explanation of Descriptions in Table 1

Silica Master Batches

Base-1: Silica master batch 1 prepared in Preparation Example 1. Silica master batch 1 contained 68 parts by weight of component (a-1) and 32 parts by weight of component (D) which is a fumed silica described below, per 100 parts by weight of silica master batch 1.

Component (A)

Component (A-1)

a-1: a dimethylpolysiloxane that had a viscosity of 40,000 mPa·s and was terminated at both terminals of the molecular chain with dimethylvinylsiloxy groups; the amount of vinyl groups was about 0.09% by weight.

Component (A-2)

a-2: a cyclic methylvinylpolysiloxane that had a viscosity of 3.5 mPa·s; the amount of vinyl groups was about 30.7% by weight.

a-3: a copolymer of dimethylsiloxane and methylvinylsiloxane that had a viscosity of 20 mPa·s and was terminated at both terminals of the molecular chain with dimethylhydroxysiloxy groups; the amount of vinyl groups was about 10.9% by weight.

Component (B)

Component (B-1)

b-1: a copolymer of dimethylsiloxane and methylhydrogensiloxane that had a kinematic viscosity of 5 mm$^2$/s and was terminated at both terminals of the molecular chain with trimethylsiloxy groups; the amount of silicon atom-bonded hydrogen atoms was about 0.76% by weight.

Component (B-2)

b-2: a dimethylpolysiloxane that had a kinematic viscosity of 11 mm$^2$/s and was terminated at both terminals of the molecular chain with dimethylhydrogensiloxy groups; the amount of silicon atom-bonded hydrogen atoms was about 0.17% by weight.

Component (C)

Platinum catalyst: a 1,3-divinyltetramethyldisiloxane solution of a platinum complex of 1,3-divinyltetramethyldisiloxane; the amount of metallic platinum was about 4000 ppm.

Adhesion Promoter (Component (E))

AD-1: 3-methacryloxypropyltrimethoxysilane
AD-2: a mixture of 50 parts by weight of a zirconium tetracetylacetonate with 50 parts by weight of a dimethylpolysiloxane that had a viscosity of 400 mPa·s and was terminated at both terminals of the molecular chain with dimethylvinylsiloxy groups.

Curing Retardant

Inh-1: 3,5-dimethyl-1-octyn-3-ol.

TABLE 1

|  |  | Example 1 | Example 2 | Example 3 | Example 4 | Comparative Example 1 | Comparative Example 2 |
|---|---|---|---|---|---|---|---|
| Silica master batch | base-1 | 64 | 64 | 64 | 64 | 64 | 64 |
| A-1 | a-1 | 31 | 30 | 30 | 32 | 31 | 33 |
| A-2 | a-2 | 0.20 | 0.20 | 0.20 |  | 0.20 |  |
|  | a-3 | 0.15 | 0.15 | 0.15 |  | 0.15 |  |
| B-1 | b-1 | 0.24 | 0.12 |  |  | 0.34 | 0.18 |

TABLE 1-continued

|  |  | Example 1 | Example 2 | Example 3 | Example 4 | Comparative Example 1 | Comparative Example 2 |
|---|---|---|---|---|---|---|---|
| B-2 | b-2 | 2.82 | 3.34 | 3.91 | 2.08 | 2.36 | 1.25 |
| Proportion of number of SiH groups of B-2 accounted for in the total number of SiH groups of B-1 and B-2 |  | 72% | 85% | 100% | 100% | 60% | 60% |
| Platinum catalyst |  | 0.32 | 0.32 | 0.32 | 0.32 | 0.32 | 0.32 |
| Curing retardant | Inh-1 | 0.90 | 0.90 | 0.90 | 0.90 | 0.90 | 0.90 |
| Adhesion promoter | AD-1 | 0.60 | 0.60 | 0.60 | 0.60 | 0.60 | 0.60 |
|  | AD-2 | 0.25 | 0.25 | 0.25 | 0.25 | 0.25 | 0.25 |
| JIS A hardness |  | 11 | 8 | 4 | 4 | 13 | 13 |
| Elongation at break | % | 1480 | 1670 | 2000 | 2150 | 1230 | 1350 |
| Tensile strength | MPa | 6.5 | 5.3 | 3.2 | 1.3 | 6.4 | 6.8 |
| Viscosity | Pa·s | 208 | 200 | 196 | 226 | 198 | 220 |
| Scott type crease-flex abrasion test |  | 5 | 5 | 5 | 5 | 5 | 5 |
| Inner pressure-holding properties | 70 g/m² | Passed | Passed | Passed | Passed | Not-passed | Not-passed |
|  | 50 g/m² | Passed | Passed | Passed | Passed | Not-passed | Not-passed |
|  | 35 g/m² | Passed |  |  |  |  |  |

The amount of individual components in Table 1 is in terms of parts by weight.

Evaluation Results

From the evaluation results of inner pressure-holding properties of silicone rubber-coated woven fabrics obtained by coating a liquid curable silicone rubber composition at coating amounts of 70 g/m², 50 g/m², or 35 g/m² onto a Nylon 66 hollow woven fabric, followed by heat curing, it can be seen that the liquid curable silicone rubber composition of the present invention is capable of exhibiting favorable inner pressure-holding properties even with a small coating amount of 35 g/m². Specifically, with regard to Examples of the present invention where the number of SiH groups contained in component (B-2) is 72 to 100% relative to the total number of SiH groups contained in component (B-1) and component (B-2), even when the coating amount of the liquid curable silicone rubber composition onto a woven fabric is a small amount of 35 g/m², the resulting silicone rubber-coated woven fabric is capable of maintaining an inner pressure of 50 kg/m² or more for 6 seconds or longer when applying an inner pressure of 70 kg/m². On the other hand, with regard to Comparative Examples 1 and 2 where the number of SiH groups in component (B-2) is set to 60% of that of SiH groups of combined components (B-1) and (B-2), even when a coating amount of the curable silicone rubber composition onto a woven fabric is applied at an amount of 70 g/m² which is double 35 g/m², the resulting silicone rubber-coated woven fabric is incapable of maintaining an inner pressure of 50 kg/m² or more for 6 seconds or longer under the same measurement conditions.

INDUSTRIAL APPLICABILITY

The liquid curable silicone rubber composition of the present invention is suitable for applications which require capability for the fabric structure to maintain a constant fluid pressure over a relatively long time under fluid-assisted pressurized conditions. For example, the composition can be preferably used for coated woven fabrics utilized in applications of vehicle side curtain airbags, aircraft emergency exit seats, inflatable rafts, or the like. The coated fabric obtained by coating and curing the liquid curable silicone rubber of the present invention may preferably find applications in vehicle side curtain airbags, aircraft emergency exit seats, inflatable rafts, etc.

The invention claimed is:

1. A liquid curable silicone rubber composition comprising the following components of (A), (B), (C) and (D):
   (A) 100 parts by weight of an organopolysiloxane having one or more silicon atom-bonded alkenyl groups on average in one molecule; said component (A) comprising component (A-1) and component (A-2),
   wherein component (A-1) is an organopolysiloxane having at least two alkenyl groups in one molecule, in which the content of the alkenyl group ranges from 0.02 to 1.9% by weight, and has a viscosity of 100 to 1,000,000 mPa·s, and
   component (A-2) is an organopolysiloxane having at least two alkenyl groups in one molecule, in which the content of the alkenyl group ranges from 8 to 50% by weight, and has a viscosity of less than 50 mPa·s;
   (B) (B-1) an organohydrogenpolysiloxane having at least three silicon atom-bonded hydrogen atoms in one molecule, wherein at least one of the hydrogen atoms is present as a siloxane unit represented by the formula of $R^1HSiO_{2/2}$ wherein $R^1$ represents a non-substituted or substituted monovalent hydrocarbon group containing no aliphatic unsaturated bond in the molecule and
   (B-2) a linear organohydrogenpolysiloxane having one silicon atom-bonded hydrogen atom only at each of both terminals of the molecular chain and having no aliphatic unsaturated bond(s) in a molecule,
   provided that the blending amount of component (B-1) and component (B-2) is an amount such that the molar ratio of silicon atom-bonded hydrogen atoms contained in component (B-1) and component (B-2): alkenyl groups contained in component (A) ranges from (0.8:1.0) to (2.5:1.0), and the total number of silicon atom-bonded hydrogen atoms contained in component (B-2) is 70 to 100% of the total number of silicon atom-bonded hydrogen atoms contained in component (B-1) and component (B-2); provided that when the aforementioned numerical value is 100%, component (B) consists only of (B-2);
   (C) an amount of a hydrosilylation reaction catalyst necessary to cure the liquid curable silicone rubber composition; and
   (D) 0.1 to 50 parts by weight of a reinforcing silica fine powder.

2. The liquid curable silicone rubber composition according to claim 1, further comprising (E) 0.05 to 5 parts by weight of an adhesion promoter.

3. A woven fabric coated with a cured product of the liquid curable silicone rubber composition of claim 1.

4. The woven fabric according to claim 3, wherein the coated woven fabric is a sealed body.

5. A method for producing the woven fabric of claim 3, comprising:
    coating a liquid curable silicone rubber composition onto a woven fabric, wherein the liquid curable silicone rubber composition comprises the following components of (A), (B), (C) and (D):
    (A) 100 parts by weight of an organopolysiloxane having one or more silicon atom-bonded alkenyl groups on average in one molecule, said component (A) comprising component (A-1) and component (A-2),
    wherein component (A-1) is an organopolysiloxane having at least two alkenyl groups in one molecule, in which the content of the alkenyl group ranges from 0.02 to 1.9% by weight, and has a viscosity of 100 to 1,000,000 mPa·s, and
    component (A-2) is an organopolysiloxane having at least two alkenyl groups in one molecule, in which the content of the alkenyl group ranges from 8 to 50% by weight, and has a viscosity of less than 50 mPa·s;
    (B) (B-1) an organohydrogenpolysiloxane having at least three silicon atom-bonded hydrogen atoms in one molecule, wherein at least one of the hydrogen atoms is present as a siloxane unit represented by the formula of $R^1HSiO_{2/2}$ wherein $R^1$ represents a non-substituted or substituted monovalent hydrocarbon group containing no aliphatic unsaturated bond in the molecule and
    (B-2) a linear organohydrogenpolysiloxane having one silicon atom-bonded hydrogen atom only at each of both terminals of the molecular chain and having no aliphatic unsaturated bond(s) in a molecule,
    provided that the blending amount of component (B-1) and component (B-2) is an amount such that the molar ratio of silicon atom-bonded hydrogen atoms contained in component (B-1) and component (B-2): alkenyl groups contained in component (A) ranges from (0.8:1.0) to (2.5:1.0), and the total number of silicon atom-bonded hydrogen atoms contained in component (B-2) is 70 to 100% of the total number of silicon atom-bonded hydrogen atoms contained in component (B-1) and component (B-2); provided that when the aforementioned numerical value is 100%, component (B) consists only of (B-2),
    (C) an amount of a hydrosilylation reaction catalyst necessary to cure the liquid curable silicone rubber composition, and
    (D) 0.1 to 50 parts by weight of a reinforcing silica fine powder; and
    curing the liquid curable silicone rubber composition to form a cured silicone rubber coating layer on the woven fabric.

6. The liquid curable silicone rubber composition according to claim 1, further comprising 0.001 to 5 parts by weight of a curing retardant.

7. The liquid curable silicone rubber composition according to claim 1, wherein the composition has a viscosity at 25° C. of 100 to 500 Pa·s.

8. The liquid curable silicone rubber composition according to claim 1, wherein component (A) further comprises silicon atom-bonded methyl groups or silicon atom-bonded phenyl groups.

9. The liquid curable silicone rubber composition according to claim 1, wherein component (A) further comprises, at a molecular chain terminal or side chain, at least one hydroxyl group, at least one methoxy group or at least one ethoxy group.

10. The liquid curable silicone rubber composition according to claim 1, wherein component (A-1) comprises the organopolysiloxane or a mixture of organopolysiloxanes, having at least two alkenyl groups in one molecule, in which the content of the alkenyl group ranges from 0.02 to 0.5% by weight.

11. The liquid curable silicone rubber composition according to claim 1, wherein component (A-1) comprises the organopolysiloxane or a mixture of organopolysiloxanes, having at least two alkenyl groups in one molecule, in which the content of the alkenyl group ranges from 0.02 to 1.9% by weight and component (A-2) comprises the organopolysiloxane or a mixture of organopolysiloxanes, having at least two alkenyl groups in one molecule, in which the content of the alkenyl group ranges from 8 to 50% by weight, provided the total moles of alkenyl groups in component (A-2) are 0.5 to 2 times the total moles of alkenyl groups in component (A-1).

12. The woven fabric according to claim 4, wherein the sealed body is an airbag.

13. The method of claim 5, wherein coating the liquid curable silicone rubber composition includes coating 25 to 150 g/m² of the composition onto the woven fabric.

14. The method of claim 5, wherein curing the liquid curable silicone rubber composition includes heating the composition at a temperature of from 150 to 200° C. for 1 to 2 minutes.

* * * * *